United States Patent
Smith et al.

(10) Patent No.: US 9,727,076 B2
(45) Date of Patent: Aug. 8, 2017

(54) HAND CONTROL DEVICE FOR CONTROLLING A PERIPHERAL SYSTEM

(71) Applicant: Sarcos LC, Salt Lake City, UT (US)

(72) Inventors: Fraser M. Smith, Salt Lake City, UT (US); Shane Olsen, Waltham, MA (US)

(73) Assignee: Sarcos LC, Salt Lake City, UT (US)

( * ) Notice: Subject to any disclaimer, the term of this patent is extended or adjusted under 35 U.S.C. 154(b) by 859 days.

(21) Appl. No.: 13/665,697

(22) Filed: Oct. 31, 2012

(65) Prior Publication Data

US 2014/0116183 A1    May 1, 2014

(51) Int. Cl.
| G05G 11/00 | (2006.01) |
| G05G 9/047 | (2006.01) |
| G05G 13/00 | (2006.01) |
| G06F 3/0338 | (2013.01) |

(52) U.S. Cl.
CPC ............. *G05G 9/047* (2013.01); *G05G 13/00* (2013.01); *G06F 3/0338* (2013.01); *Y10T 74/20372* (2015.01)

(58) Field of Classification Search
CPC .......................... G05G 13/00; Y10T 74/20372
USPC .......................................................... 414/5
See application file for complete search history.

(56) References Cited

U.S. PATENT DOCUMENTS

| 3,171,549 | A | * | 3/1965 | Orloff ................................ 414/6 |
| 3,449,008 | A | * | 6/1969 | Colechia ....................... 294/197 |
| 4,575,297 | A | * | 3/1986 | Richter ............................ 414/5 |
| 5,516,249 | A | * | 5/1996 | Brimhall .......................... 414/5 |
| 5,577,417 | A | * | 11/1996 | Fournier ......................... 74/523 |
| 5,898,599 | A | * | 4/1999 | Massie et al. ................ 345/161 |
| 5,912,658 | A | * | 6/1999 | Bergamasco et al. ........ 345/156 |
| 6,435,794 | B1 | * | 8/2002 | Springer .......................... 414/5 |
| 6,508,058 | B1 | * | 1/2003 | Seaverson ....................... 60/393 |
| 7,862,522 | B1 | * | 1/2011 | Barclay et al. ............... 600/595 |
| 8,881,616 | B2 | * | 11/2014 | Dize .................... G05G 9/047 345/161 |
| 2001/0043847 | A1 | * | 11/2001 | Kramer .............................. 414/5 |
| 2002/0075233 | A1 | * | 6/2002 | White et al. .................. 345/161 |
| 2003/0223844 | A1 | * | 12/2003 | Schiele et al. .................... 414/5 |
| 2005/0099386 | A1 | * | 5/2005 | Kukita .......................... 345/156 |
| 2005/0159850 | A1 | * | 7/2005 | Melman ........................... 701/1 |
| 2011/0219899 | A1 | * | 9/2011 | Dize .................... G05G 9/047 74/471 XY |

* cited by examiner

*Primary Examiner* — Scott Lowe

(57) ABSTRACT

A hand control device for controlling a peripheral system is disclosed. The hand control device can include a handle configured to be grasped by a user. The handle can comprise a body portion to be supported against a palm of the user. The hand control device can also include a finger control supported about the handle and comprising a rotatable joint to facilitate control based on flexion/extension of an index finger of the user. In addition, the hand control device can include a thumb control supported about the handle and comprising first and second rotatable joints to facilitate control based on flexion/extension and abduction/adduction of a thumb of the user.

23 Claims, 3 Drawing Sheets

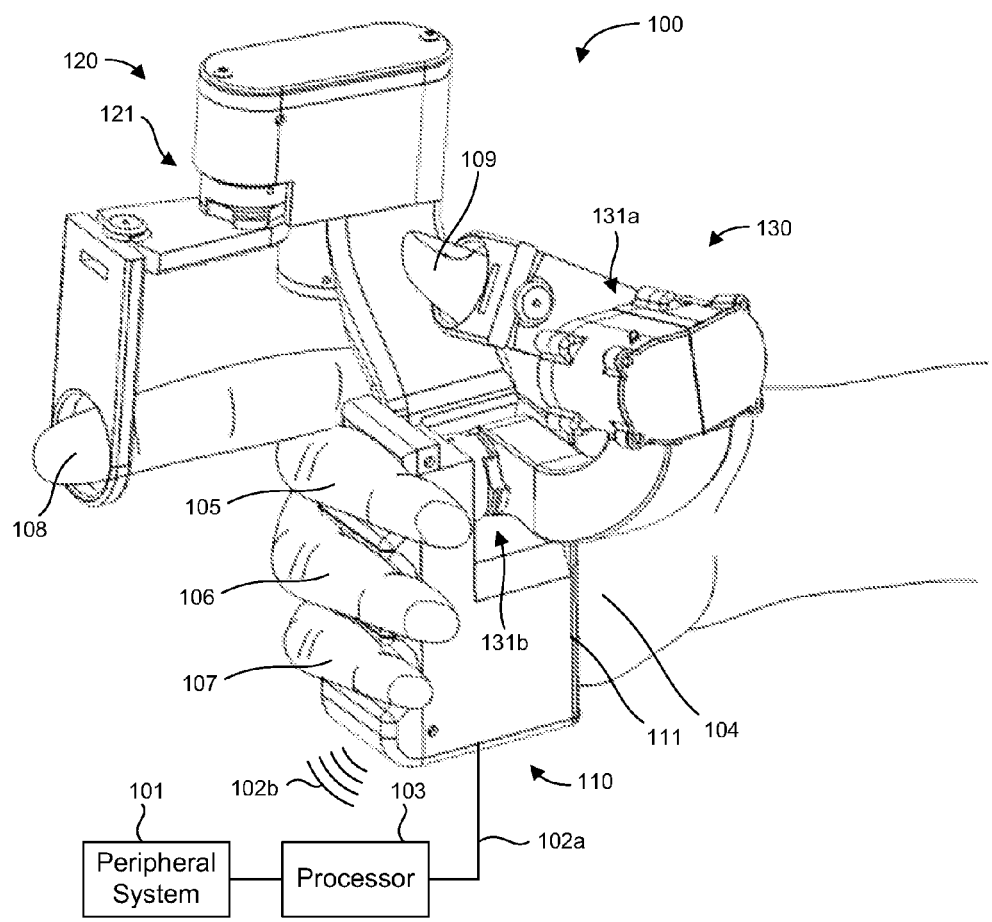
FIG. 1
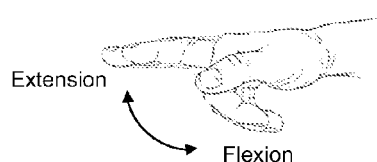
FIG. 2
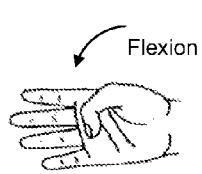 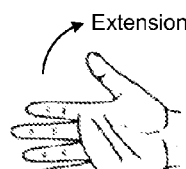 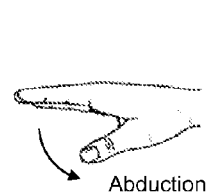 
FIG. 3A   FIG. 3B   FIG. 3C   FIG. 3D

HAND CONTROL DEVICE FOR CONTROLLING A PERIPHERAL SYSTEM

BACKGROUND

Robotic devices, such as those having robotic end effectors, are often used in hazardous, unstructured environments where a human operator should not or cannot be present, but where it is desirable to have a human operator to properly operate the robot. With an intuitive mastering device, the human operator can be more productive. Robotic master control devices exist in many different form factors. Conventional master control devices providing degrees of freedom at the hand, referred to herein as robotic master hands, are generally based on wearable glove devices or external mechanisms attached to the back of the hand. In order to accommodate the movement of the human operator's hand, many prior robotic master hands employ complicated mechanisms or structurally elaborate components to accomplish their task resulting in cumbersome devices that are bulky, expensive, and non-robust. Furthermore, many of such devices do not incorporate force reflection functionality due to its difficulty and complexity. Other industries or areas of interest, namely video games and virtual environments, have not, until recently, had the complexity where such physics-based quantities could realistically be determined in real-time. As a result, it is believed that there currently are no force reflective human/virtual environment interfaces and control devices that employ force reflection that are sufficiently effective and economical, particularly economical enough to be used with video games.

BRIEF DESCRIPTION OF THE DRAWINGS

Features and advantages of the invention will be apparent from the detailed description which follows, taken in conjunction with the accompanying drawings, which together illustrate, by way of example, features of the invention; and, wherein:

FIG. 1 is an example illustration of a hand control device for controlling a peripheral system engaged with a hand of a user, in accordance with an embodiment of the present invention.

FIG. 2 illustrates finger flexion/extension.

FIGS. 3A-3D illustrate thumb flexion/extension and abduction/adduction.

Figure 4A:
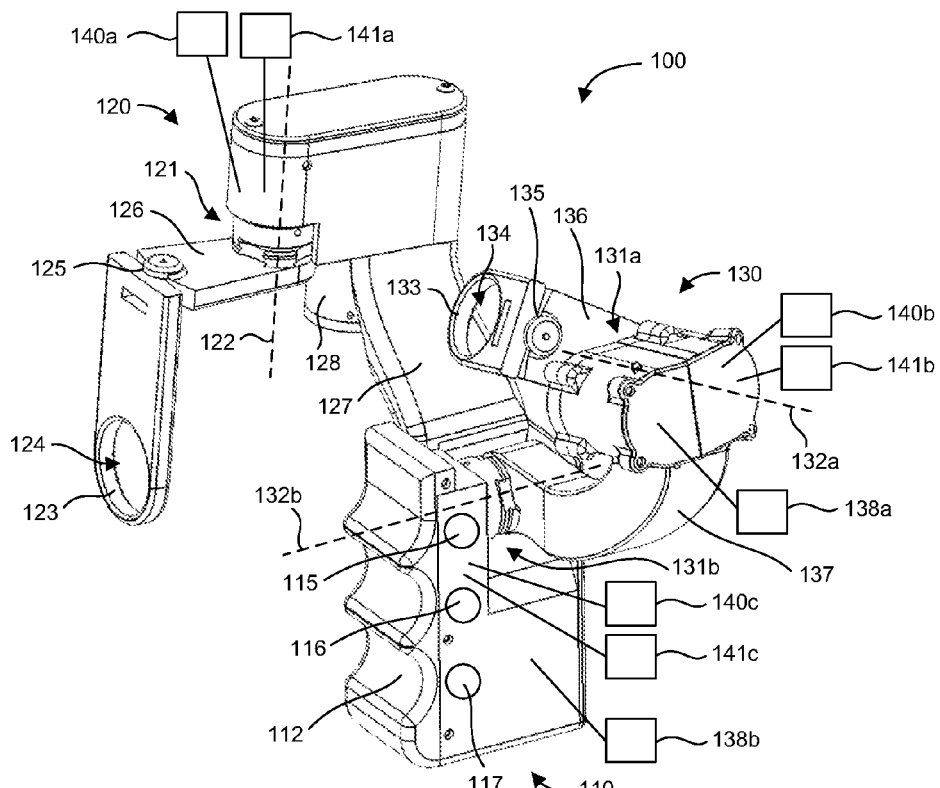
FIG. 4A is a front perspective view of the hand control device of FIG. 1.

Reference will now be made to the exemplary embodiments illustrated, and specific language will be used herein to describe the same. It will nevertheless be understood that no limitation of the scope of the invention is thereby intended.

DETAILED DESCRIPTION

As used herein, the term "substantially" refers to the complete or nearly complete extent or degree of an action, characteristic, property, state, structure, item, or result. For example, an object that is "substantially" enclosed would mean that the object is either completely enclosed or nearly completely enclosed. The exact allowable degree of deviation from absolute completeness may in some cases depend on the specific context. However, generally speaking the nearness of completion will be so as to have the same overall result as if absolute and total completion were obtained. The use of "substantially" is equally applicable when used in a negative connotation to refer to the complete or near complete lack of an action, characteristic, property, state, structure, item, or result.

As used herein, "adjacent" refers to the proximity of two structures or elements. Particularly, elements that are identified as being "adjacent" may be either abutting or connected. Such elements may also be near or close to each other without necessarily contacting each other. The exact degree of proximity may in some cases depend on the specific context.

An initial overview of technology embodiments is provided below and then specific technology embodiments are described in further detail later. This initial summary is intended to aid readers in understanding the technology more quickly but is not intended to identify key features or essential features of the technology nor is it intended to limit the scope of the claimed subject matter.

Although master control devices exist in a variety of forms, current mastering devices are often complicated, cumbersome, unreliable, and expensive, with none of these offering an economical force reflective interface for a virtual world environment, such as a video game. Thus, there is a need to intuitively teleoperate robotic end effectors and control virtual world interfaces with compact, affordable, and reliable mastering devices.

Accordingly, a hand control device for controlling a peripheral system is disclosed that provides a compact hand control that is easy and intuitive to use. A "peripheral system" or device can include any system or device, component thereof, or aspect thereof, controllable by the hand control device. Peripheral systems or devices can include, but are not limited to, electronic systems or devices, robotic systems or devices, objects or aspects within a virtual environment, etc.

In one exemplary embodiment, to be discussed in more detail below, the hand control device provides for control with at least one thumb degree of freedom and at least one finger degree of freedom. The hand control device can include a handle configured to be grasped by a user. The handle can comprise a body portion to be supported against a palm of a user. The hand control device can also include a finger control supported about the handle and comprising a rotatable joint to facilitate control based on flexion/extension of an index finger of the user. Additionally, the hand control device can include a thumb control supported about the handle and comprising first and second rotatable joints to facilitate control based on flexion/extension and abduction/adduction of a thumb of the user.

In another exemplary embodiment, also to be discussed in more detail below, a hand control device for controlling a peripheral system, or a component thereof, is disclosed. The hand control device can include a handle configured to be grasped by a user and can comprise a body portion to be supported against a palm of the user. A finger control can be supported about the handle and can comprise a rotatable joint to facilitate control based on flexion/extension of an index finger of the user. The hand control device can also include a finger actuator operable to provide force reflection for the finger control, and can be configured to be operable with and located proximate the joint of the finger control. A thumb control can be supported about the handle and can comprise first and second rotatable joints to facilitate control based on flexion/extension and abduction/adduction of a thumb of the user. The hand control device can further comprise a first thumb actuator and a second thumb actuator operable to provide force reflection for the thumb control. The first thumb actuator can be configured to be operable with and located proximate the first rotatable joint and the second thumb actuator can be configured to be operable with and located proximate the second rotatable joint. In addition, the hand control device can include one or more force sensors operatively associated with the finger control and the thumb control, respectively, the force sensors being configured to provide force data for force reflection of the finger control and the thumb control.

One embodiment of a hand control device 100 for controlling a peripheral system 101, or a component or aspect thereof, is illustrated in FIG. 1. The hand control device 100 can be in wired 102a and/or wireless 102b communication with the peripheral system 101, such as by a transceiver or other such device. In one aspect, the hand control device 100 can communicate data to a processor 103 that can operate a control system for controlling the peripheral system 101. It should be recognized that the processor 103 can be integrated with or separate from the hand control device 100. The hand control device 100 can function as a controller for a robotic system or device, as a controller for a virtual world interface, such as for a video game, or coordinated multi-degree-of-freedom control within a synthetic environment.

The hand control device 100 can include a handle 110 configured to be grasped by a user. The handle 110 can comprise a body portion 111 to be supported against a palm 104 of a user. In one aspect, the handle 110 can be configured to be supported against the palm 104 of the user by at least one finger of the user, such as by a middle finger 105, a ring finger 106, and/or a little finger 107. The handle 110 can form the basis for the physical interface with the user. As illustrated, the handle 110 can comprise a pistol grip configuration, although any other suitable configuration may be used. Utilizing the handle 110 as a basis of support for the finger control 120 and the thumb control 130 can provide a compact form factor for the hand control device 100.

The hand control device 100 can further comprise and can further include a finger control 120 supported about the handle 110. The finger control 120 can comprise a rotatable joint 121 to facilitate control based on intuitive and normal human flexion/extension of an index finger 108 of the user. FIG. 2 illustrates flexion/extension of a finger. In addition, the hand control device 100 can further comprise and can further include a thumb control 130 supported about the handle 110. The thumb control 130 can comprise first and second rotatable joints 131a, 131b to facilitate control based on normal and human flexion/extension and abduction/adduction of a thumb 109 of the user. FIGS. 3A-3D illustrate flexion/extension and abduction/adduction of a thumb. Essentially, the hand control device 100 provides an operator to control a peripheral system or device by moving his/her finger(s) and thumb in a familiar, intuitive manner, which movements translate into manipulation of the finger and thumb controls 120 and 130, respectively, each of which are strategically located about the hand of the user to receive the finger and thumb, and each of which are configured to move in a coordinated, harmonized manner.

Figure 4B:
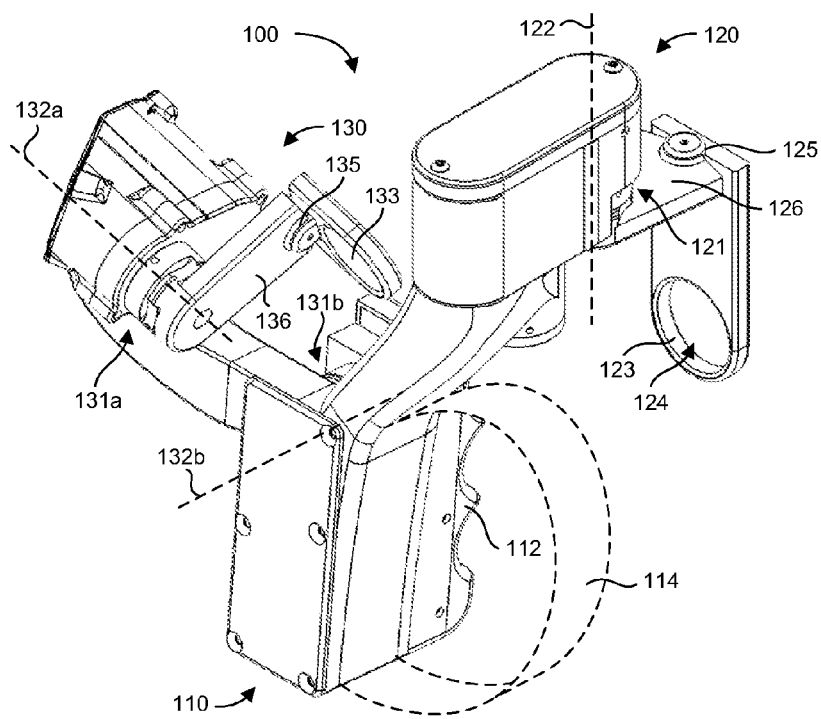
FIG. 4B is a rear perspective view of the hand control device of FIG. 1.

With reference to FIGS. 4A and 4B and continuing reference to FIG. 1, the joint 121 of the finger control 120 can be rotatable about an axis 122 to provide control in one degree of freedom. The finger control 120 can also include a finger interface 123 to couple the index finger 108 of the user to the finger control 120. The finger interface 123 can comprise an opening 124 to receive at least a portion of the index finger 108. The finger interface 123 can be pivotally supported, such as by a rotatable joint 125, to facilitate movement of the finger interface 123 with the index finger 108. The finger interface 123 can include any pivoting, rotating, and/or translating ring or cup as an interface for the index finger of the user.

In one aspect, a pivot arm 126 can extend from the joint 121, and the joint 125 can couple the finger interface 123 to the pivot arm 126 to rotatably couple the finger interface 123 about the axis 122 to facilitate flexion/extension of the index finger 108 and control of a portion of the hand control device 100. The pivoting action of the joint 125 can allow the finger interface 123 to move with a portion of the index finger 108 to maintain comfort for the user throughout the range of motion of the finger control 120. In other words, the pivoting action of the joint 125 can reduce or eliminate sliding or binding of the index finger 108 on or with the finger interface 123 as the finger flexes through its range of motion by maintaining the finger interface 123 in a substantially orthogonal position relative to a longitudinal axis of the finger of the user through this range of motion.

An extension member 127 can extend from the handle 110 to position and support the finger control 120 about the handle 110 (and the hand of a user once engaged with the hand control device 100. The extension member 127 can be configured to extend between the index finger 108 and the thumb 109 of the user when grasping the handle 110. Locating the finger control joint 121 adjacent to or proximate the user's hand can provide a compact form factor for the hand control device 100.

Joints 131a, 131b of the thumb control 130 can be rotatable about axes 132a, 132b, respectively, to provide control in two degrees of freedom. The thumb control 130 can also include a thumb interface 133 to couple the thumb 109 of the user to the thumb control 130. The thumb interface 133 can comprise an opening 134 to receive at least a portion of the thumb 109. The thumb interface 133 can be pivotally supported, such as by rotatable joint 135, to facilitate movement of the thumb interface 133 with the thumb 109. The thumb interface 133 can include any pivoting, rotating, and/or translating ring or cup as an interface for the thumb of the user. In one example, the finger interface 123 and/or the thumb interface 133 can include a full or partial glove that is donned by the user that has the various components of the hand control device 100, as described herein, attached to it.

In one aspect, a pivot arm 136 can extend from the joint 131a, and the joint 135 can couple the thumb interface 133 to the pivot arm 136 to rotatably couple the thumb interface 133 about the axis 132a to facilitate flexion/extension of the thumb and control of a portion of the hand control device 100. The pivoting action of the joint 135 can allow the thumb interface 133 to move with a portion of the thumb 109 to maintain comfort for the user throughout the range of motion of the thumb control 130. In other words, the pivoting action of the joint 135 can reduce or eliminate sliding or binding of the thumb 109 on or with the thumb interface 133 as the thumb moves through its various ranges of motion about both axes by maintaining the thumb interface 133 in a substantially orthogonal position relative to a longitudinal axis of the thumb of the user through this range of motion.

A pivot arm 137 can extend from the joint 131b to position and support the joint 131a and rotatably couple the thumb interface 133 about the axis 132b to control abduction/adduction of the thumb 109. Locating the thumb control joint 131a in or proximate the handle 110 and/or locating the thumb control joint 131*b* adjacent to or proximate the user's hand can provide a compact form factor for the hand control device 100.

As schematically illustrated in FIG. 4A, position sensors 140*a*, 140*b*, 140*c* can be operatively associated with the finger control 120 and/or the thumb control 130 to provide position data for controlling the peripheral system 101. Thus, in one aspect, the hand control device 100 can function as a position master control. The position sensors 140*a*, 140*b*, 140*c* can be disposed in any suitable location. As a practical matter, the position sensors 140*a*, 140*b*, 140*c* may be disposed proximate to joints 121, 131*a*, 132*b* associated with axes 122, 132*a*, 132*b* that provide movement and control in the various discussed degrees of freedom. This can facilitate positional control over the peripheral system 101 in the respective degrees of freedom.

In one embodiment, the hand control device 100 can be configured to provide force reflection for the user. Force reflection can provide a greater degree of control and sensory feedback to the user by allowing the user to sense forces acting on or within the controlled peripheral system, whether such forces are based in a real or virtual environment. With force reflection, the user can sense the degree of force or pressure acting on or within the peripheral system as a proportional amount of this force or pressure is reflected back to the hand control device 100. With this type of feedback, the user can be made aware of the forces being applied by or within (i.e., at) the peripheral system so the user can adapt and/or make various modifications in control, such as by reducing the amount of force being applied by way of the hand control device in the event too much force is being exerted that may cause damage. Accordingly, the hand control device 100 can also include a finger actuator 128 associated with or otherwise operable to provide force reflection for the finger control 120 in a degree of freedom associated with axis 122. As used herein, and in one aspect, an actuator can be of the "active" type meaning the actuator can exert a force tending to cause or induce movement in the hand control device 100, such as a hydraulic or pneumatic actuator. In another aspect, an actuator can be of the "passive" type, meaning the actuator can resist movement, such as by way of a brake, in order to provide force reflection to the user. As shown in the figures, the finger actuator 128 can be configured to be operable with and located proximate the joint 121 of the finger control 120. The finger actuator 128 can be operably coupled to the pivot arm 126 to transfer force to the index finger 108 of the user. Locating the finger actuator 128 adjacent to or proximate the finger control joint 121 can further contribute to the compact form factor of the hand control device 100.

As schematically illustrated in FIG. 4A, the hand control device 100 can also include thumb actuators 138*a*, 138*b* associated with or otherwise operable to provide force reflection for the thumb control 130 in degrees of freedom associated with axes 132*a*, 132*b*. The thumb actuator 138*a* can be configured to be operable with and located proximate the rotatable joint 131*a*. The thumb actuator 138*a* can be operably coupled to the pivot arm 136 to transfer force to the thumb 109 of the user. The thumb actuator 138*b* can be configured to be operable with and located proximate the rotatable joint 131*b*. The thumb actuator 138*b* can be operably coupled to the pivot arm 137 to transfer force to the thumb 109 of the user. Locating the thumb actuator 138*b* in or proximate the handle 110 and/or locating the thumb control actuator 138*a* adjacent to or proximate the thumb control joint 131*a* can still further contribute to the compact form factor for the hand control device 100.

Figure 5:
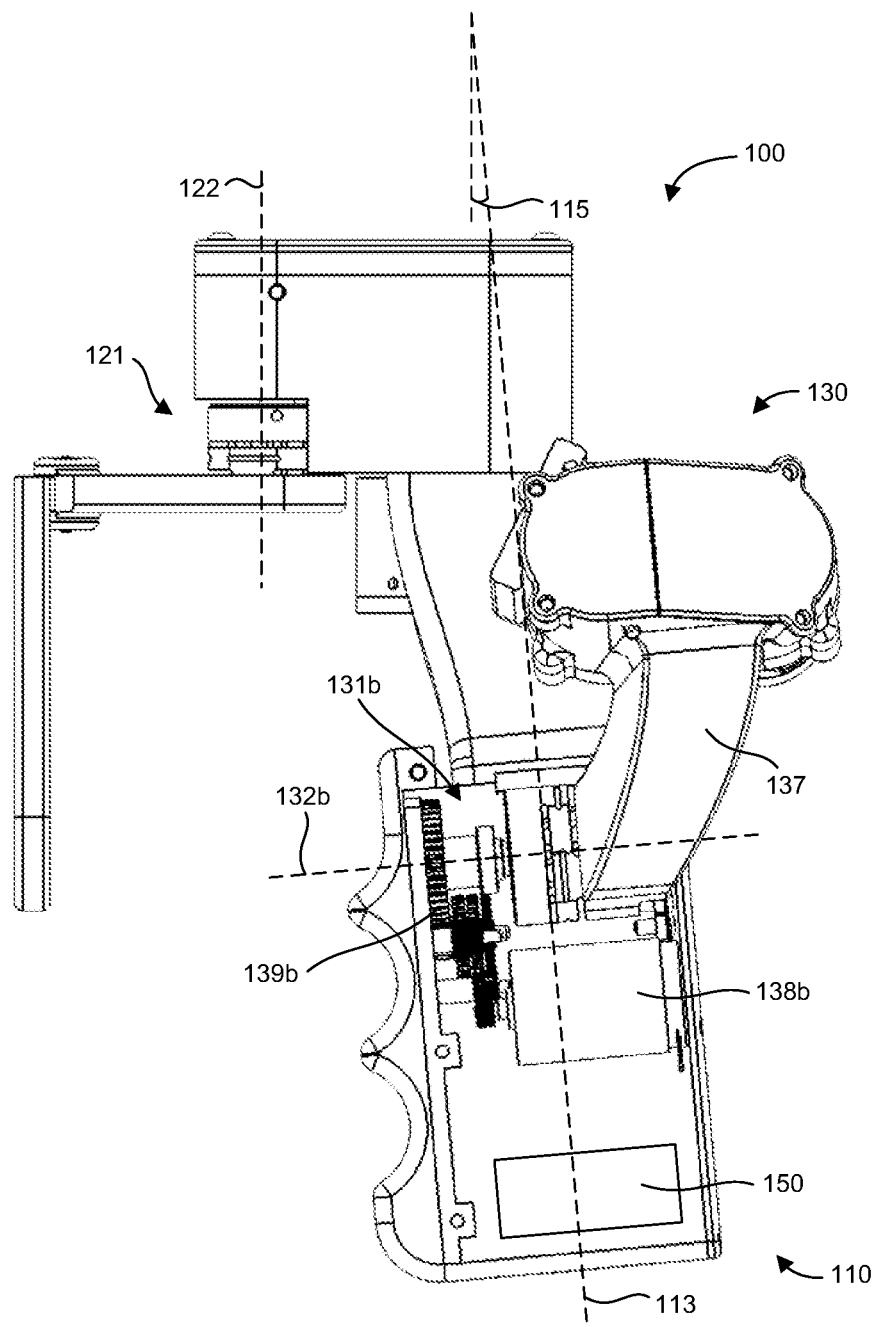
FIG. 5 is a side view of the hand control device of FIG. 1.

FIG. 5 illustrates a cutaway of the handle 110 to reveal the thumb actuator 138*b* associated with the handle 110 and the thumb control 130. The actuator 138*b* can be operatively coupled to the pivot arm 137 via the joint 131*b* and a drivetrain 139*b*. The actuator 138*b* can function to cause and/or resist rotation of the pivot arm 137 about the axis 132*b* to provide force reflection to the user. The actuator 138*b* can be disposed in any suitable location relative to the axis 132*b*, the joint 131*b*, and pivot arm 137. As illustrated, the actuator 138*b* is offset from the axis 132*b* and proximate or near the joint 131*b*, the actuator 138*b* being supported within the handle 110. Any suitable means can be used to transfer force or torque from the actuator 138*b* to the pivot arm 137, such as the drivetrain 139*b* or other suitable load transferring mechanism. In the embodiment illustrated, the drivetrain 139*b* comprises a series of gears that mechanically couple the actuator 138*b* to the pivot arm 137, such that a force or torque can be transferred from the actuator 138*b* to the pivot arm 137. In one aspect, not illustrated, a rotational axis of an actuator can be substantially collinear with the axis 132*b*. In this case, a drivetrain may or may not be used, depending on the output of the actuator. Although not shown, similar actuators and drivetrain assemblies can be provided for the degrees of freedom associated with joints 121, 131*a* (see FIG. 4A) and axes 122, 132*a*, respectively. Also illustrated is a battery 150 that can be included to provide power for the hand control device 100, such as for an actuator, a sensor, a processor, a transceiver, etc.

As further schematically illustrated in FIG. 4A, one or more force sensors 141*a*, 141*b*, 141*c* can be operatively associated with the finger control 120 and/or the thumb control 130 to provide force or moment data for providing force reflection to the user from the peripheral system 101, as discussed above. The force sensors 141*a*, 141*b*, 141*c* can be disposed in any suitable location. As a practical matter, the force sensors 141*a*, 141*b*, 141*c* may be disposed proximate to a joint 121, 131*a*, 132*b* associated with an axis 122, 132*a*, 132*b* providing movement and control in a degree of freedom. This can facilitate force reflection to the user by was of the hand control device 100 from the peripheral system 101 in the respective degrees of freedom.

In one aspect, a range of motion of the finger control 120 and/or the thumb control 130 can be mechanically limited by one or more mechanical or other types of stops. For example, motion of the finger control 120 can be limited by the pivot arm 126 physically contacting the extension member 127. Likewise, motion of the thumb control 130 can be limited by the pivot arm 136 physically contacting the pivot arm 137 and/or by the pivot arm 137 physically contacting a portion of the handle 110. In one aspect, a recess and/or other feature can be included in the structural parts of the hand control device 100 to provide for a simple range of motion stop. For example, a mechanical stop can also comprise a tab extending from a pivot arm or a gear associated with an actuator configured to limit rotation of the pivot arm.

As illustrated in FIGS. 4A and 4B, the handle 110 of the hand control device 100 can include a grip 112 to interface with the middle finger 105, the ring finger 106, and/or the little finger 107 of the user, which can be used to support the handle 110 against the palm of the user, and to enhance comfort to the user during operation. In one aspect, shown in FIG. 4B, the hand control device 100 can include a strap 114 or a glove configured to support and secure the handle 110 against the palm of the user. This can allow the user to support the handle 110 without using the middle finger 105, the ring finger 106, and/or the little finger 107. The strap 114 or glove can be permanently or removably attached. It should be recognized that the hand control device 100 can include one or both of the grip 112 and the strap 114 or glove.

Furthermore, the hand control device 100 can include one or more user interfaces 115, 116, 117 (e.g., a button, switch, toggle, etc.) supported about the handle 110 and operable with the middle finger 105, the ring finger 106, and/or the little finger 107 of the user to provide additional control of the peripheral system 101, or components or aspects thereof. For example, one or more of the user interfaces 115, 116, 117 can control a degree of freedom of the peripheral system 101, can comprise an on/off switch, a position switch, a trigger, or any other objects, devices, etc. used to control one or more aspects of the peripheral system 101. In one aspect, the user interfaces 115, 116, 117 can be continuously variable with regard to position and/or force. In another aspect, the mechanical stops can function to similarly control an aspect of the peripheral system 101. For example, contacting a mechanical stop at the end-of-range can provide switch functionality, as well as functionality controlled by dwell time at the end-of-range position.

Referring again to FIG. 5, the relationship of the axis 122 for the finger control joint 121 and the axis 132b for the thumb control joint 131b can be configured to provide an ergonomically correct position of the user's hand. More specifically, the hand control device 100 can be configured to maintain, at least to some extent, a "functional position" of the user's hand while interfacing with and operating the hand control device 100. The phrase "functional position," as used herein, shall be understood to mean the well-known natural or neutral orientations of the closed or semi-closed hand. One particular functional position of the hand may be identified with the wrist within about 20 degree to about 30 degree of extension, the thumb abducted, the metacarpophalangeal joints in about 15 degree to 45 degree flexion, the proximal interphalangeal joints in about 25 degree to about 30 degree flexion, and the distal interphalangeal joints in slight flexion. Although the finger(s) and the thumb of the user will undoubtedly deviate from this position, much of the functional position is still maintained.

In one aspect, the axis 132b for the thumb control joint 131b can be substantially perpendicular to a longitudinal axis 113 of the handle 110. The longitudinal axis 113 of the handle 110 can be at an angle 115 relative to the axis 122 of the finger control joint 121. The angle 115 can be selected to facilitate a comfortable wrist angle for the user (an anatomically and ergonomically correct functional position of the hand of the user) while operating the hand control device 100, such as from between greater than 0 degrees to about 15 degrees. Thus, the hand control device 100 can be specifically configured to orient the hand of the user in one or more functional positions, as such positions are commonly understood, thus providing a natural and comfortable hand position, as well as reducing the possibility of injury to the user, which injuries may include carpal tunnel syndrome, chronic joint stress, and others similar in nature that may be more likely from the use of prior related control devices not as ergonomic in their design.

In accordance with one embodiment of the present invention, a method for operating a hand control device is disclosed. The method can comprise grasping a handle of a hand control device and supporting the handle against a palm of a user. The method can also comprise engaging, with an index finger of the user, a finger control supported about the handle of the hand control device, the finger control being operable to control a peripheral system based on flexion/extension of the index finger. The method can further comprise engaging, with a thumb of the user, a thumb control supported about the handle of the hand master control device, the thumb control being operable to control the peripheral system based on flexion/extension and abduction/adduction of the thumb. Additionally, the method can comprise moving at least one of the index finger and the thumb to control the peripheral system. In one aspect, the method can comprise receiving force reflective feedback from at least one of the finger control and the thumb control in response to a force experienced by or within or at the peripheral system. It is noted that no specific order is required in this method, though generally in one embodiment, these method steps can be carried out sequentially.

It is to be understood that the embodiments of the invention disclosed are not limited to the particular structures, process steps, or materials disclosed herein, but are extended to equivalents thereof as would be recognized by those ordinarily skilled in the relevant arts. It should also be understood that terminology employed herein is used for the purpose of describing particular embodiments only and is not intended to be limiting.

Reference throughout this specification to "one embodiment" or "an embodiment" means that a particular feature, structure, or characteristic described in connection with the embodiment is included in at least one embodiment of the present invention. Thus, appearances of the phrases "in one embodiment" or "in an embodiment" in various places throughout this specification are not necessarily all referring to the same embodiment.

As used herein, a plurality of items, structural elements, compositional elements, and/or materials may be presented in a common list for convenience. However, these lists should be construed as though each member of the list is individually identified as a separate and unique member. Thus, no individual member of such list should be construed as a de facto equivalent of any other member of the same list solely based on their presentation in a common group without indications to the contrary. In addition, various embodiments and example of the present invention may be referred to herein along with alternatives for the various components thereof. It is understood that such embodiments, examples, and alternatives are not to be construed as de facto equivalents of one another, but are to be considered as separate and autonomous representations of the present invention.

Furthermore, the described features, structures, or characteristics may be combined in any suitable manner in one or more embodiments. In the following description, numerous specific details are provided, such as examples of lengths, widths, shapes, etc., to provide a thorough understanding of embodiments of the invention. One skilled in the relevant art will recognize, however, that the invention can be practiced without one or more of the specific details, or with other methods, components, materials, etc. In other instances, well-known structures, materials, or operations are not shown or described in detail to avoid obscuring aspects of the invention.

While the foregoing examples are illustrative of the principles of the present invention in one or more particular applications, it will be apparent to those of ordinary skill in the art that numerous modifications in form, usage and details of implementation can be made without the exercise of inventive faculty, and without departing from the principles and concepts of the invention. Accordingly, it is not intended that the invention be limited, except as by the claims set forth below.

What is claimed is:

1. A hand control device for controlling a peripheral system, comprising:
   a handle configured to be grasped by a user, the handle comprising a body portion to be supported against a palm of the user;
   an extension member extending from the handle;
   a finger control supported by the extension member, the finger control comprising first and second rotatable joints configured to facilitate control based on flexion/extension of an index finger of the user;
   a thumb control supported by the handle and comprising first and second rotatable joints to facilitate control based on flexion/extension and abduction/adduction of a thumb of the user, the thumb control comprising a third rotatable joint that, along with the first rotatable joint, facilitates control based on flexion/extension of a thumb of the user; and
   at least one actuator supported by the handle and operable to provide force reflection for one of the finger control or the thumb control, wherein the at least one actuator is located adjacent to a respective rotatable joint of one of the finger control or the thumb control.

2. The hand control device of claim 1, wherein the at least one actuator is a finger actuator operable to provide force reflection for the finger control, and configured to be operable with and located proximate the joint of the finger control.

3. The hand control device of claim 2, wherein the finger control comprises a pivot arm operably coupled to the finger actuator and extending from the first joint of the finger control.

4. The hand control device of claim 1, wherein the finger control comprises a finger interface to couple the index finger of the user to the finger control, wherein the first rotatable joint has a rotational axis substantially parallel to a rotational axis of the second rotatable joint, such that the finger interface is arranged in a substantially orthogonal position relative to a longitudinal axis of the index finger during flexion/extension motion of the index finger.

5. The hand control device of claim 4, wherein the finger interface comprises an opening to receive at least a portion of the index finger, wherein the finger interface is pivotally supported by the second rotatable joint to facilitate movement of the finger interface with the index finger.

6. The hand control device of claim 1, wherein the at least one actuator comprises a first thumb actuator and a second thumb actuator operable to provide force reflection for the thumb control, wherein the first thumb actuator is configured to be operable with and located proximate the first rotatable joint and the second thumb actuator is configured to be operable with and located proximate the second rotatable joint.

7. The hand control device of claim 6, wherein the thumb control comprises a first pivot arm and a second pivot arm, the first pivot arm being operably coupled to the first thumb actuator and extending from the first joint to control abduction/adduction of the thumb of the user, and the second pivot arm being operably coupled to the second thumb actuator and extending from the second joint to control flexion/extension of the thumb of the user.

8. The hand control device of claim 1, wherein the thumb control comprises a thumb interface to couple the thumb of the user to the thumb control, wherein the first rotatable joint has a rotational axis substantially parallel to a rotational axis of the third rotatable joint, such that the thumb interface is arranged in a substantially orthogonal position relative to a longitudinal axis of the thumb during flexion/extension and abduction/adduction motion of the thumb.

9. The hand control device of claim 8, wherein the thumb interface comprises an opening to receive at least a portion of the thumb, wherein the thumb interface is pivotally supported about the third rotatable joint to facilitate movement of the thumb interface with the thumb.

10. The hand control device of claim 1, further comprising at least one user interface supported by the handle and operable with at least one of a middle finger, a ring finger, and a little finger of the user to control the peripheral system.

11. The hand control device of claim 1, further comprising a position sensor and a force sensor operatively associated with at least one of the finger control and the thumb control for controlling the peripheral system and providing force reflection.

12. The hand control device of claim 1, wherein the handle is configured to be supported against the palm of the user by at least one finger of the user.

13. The hand control device of claim 12, wherein the handle comprises a grip to interface with the at least one finger of the user.

14. The hand control device of claim 1, further comprising at least one of a strap and a glove configured to support the handle against the palm of the user.

15. The hand control device of claim 1, wherein the hand control device is in at least one of wired and wireless communication with the peripheral system.

16. The hand control device of claim 1, further comprising a battery to provide power for the hand control device.

17. The hand control device of claim 1, wherein the extension member supports the finger control by the handle and is configured to extend between the index finger and the thumb of the user.

18. The hand control device of claim 1, further comprising mechanical stops to limit a range of motion of at least one of the finger control and the thumb control.

19. A hand control device for controlling a peripheral system, or a component thereof, the hand control device comprising:
   a handle configured to be grasped by a user, the handle comprising a body portion to be supported against a palm of the user;
   a finger control supported by the handle and comprising first and second rotatable joints to facilitate control based on flexion/extension of an index finger of the user;
   a finger actuator supported by the handle and positioned adjacent the rotatable joint of the finger control, the finger actuator operable to provide force reflection for the finger control, and configured to be operable with the joint of the finger control;
   a thumb control supported by the handle and comprising first and second rotatable joints to facilitate control based on flexion/extension and abduction/adduction of a thumb of the user, the thumb control comprising a third rotatable joint that, along with the first rotatable joint, facilitates control based on flexion/extension of a thumb of the user;
   a first thumb actuator and a second thumb actuator operable to provide force reflection for the thumb control, wherein the first thumb actuator is configured to be operable with and located proximate the first rotatable joint and the second thumb actuator is configured to be operable with and located proximate the second rotatable joint; and a force sensor operatively associated with the finger control and the thumb control, and configured to provide force data for force reflection of the finger control and the thumb control.

20. The hand control device of claim 19, further comprising a position sensor operatively associated with the finger control and the thumb control, and configured to provide position data for controlling the peripheral system.

21. The hand control device of claim 19, wherein the finger control comprises a finger interface to couple the index finger of the user to the finger control, and wherein the thumb control comprises a thumb interface to couple the thumb of the user to the thumb control, wherein the first rotatable joint has a rotational axis substantially parallel to a rotational axis of the second rotatable joint, such that the finger interface is arranged in a substantially orthogonal position relative to a longitudinal axis of the index finger during flexion/extension motion of the index finger.

22. A method for operating a hand control device, comprising:
   grasping a handle of a hand control device and supporting the handle against a palm of a user;
   engaging, with an index finger of the user, a finger control supported by an extension member of the hand control device, the finger control being operable to control a peripheral system based on flexion/extension of the index finger, the finger control comprising first and second rotatable joints configured to facilitate control based on flexion/extension of the index finger;
   engaging, with a thumb of the user, a thumb control supported by the handle of the hand control device, the thumb control being operable to control the peripheral system based on flexion/extension and abduction/adduction of the thumb, the thumb control comprising first and second rotatable joints configured to facilitate control based on flexion/extension of the thumb; and
   moving at least one of the index finger and the thumb to control the peripheral system, the hand control device comprising a finger actuator supported by the handle and positioned adjacent a rotatable joint of the finger control and that is operable with the rotatable joint to provide force reflection for finger control.

23. The method of claim 22, further comprising receiving force reflective feedback from at least one of the finger control and the thumb control in response to a force experienced at the peripheral system.

* * * * *